June 29, 1965 L. V. BLACK 3,192,029
APPARATUS FOR BENDING GLASS SHEETS WITH
INTERMEDIATE FINGER SUPPORT
Filed Jan. 24, 1958 3 Sheets-Sheet 2
FIG. 4
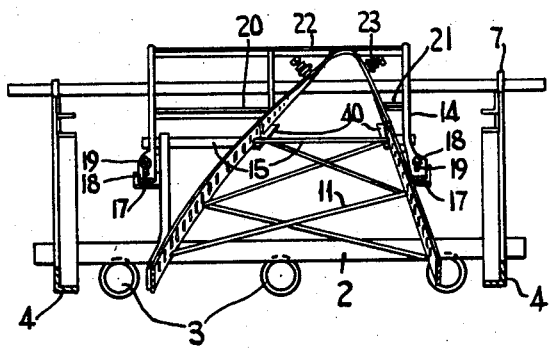
FIG. 8
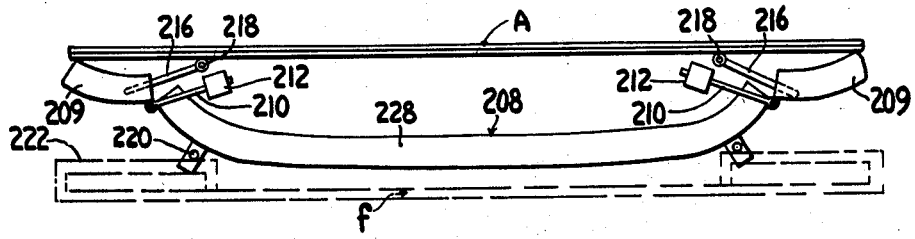
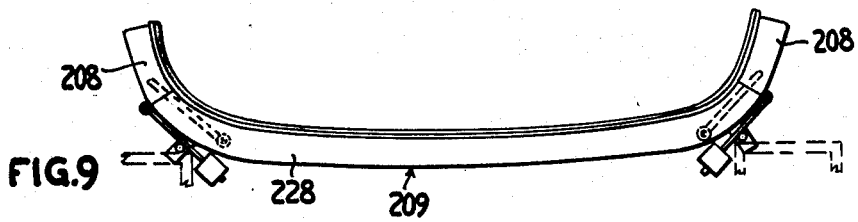
FIG. 9
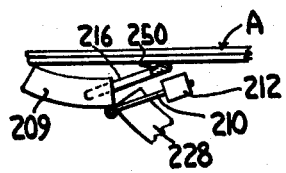
FIG. 10
INVENTOR.
LLOYD V. BLACK
BY
Oscar H. Spencer
ATTORNEY

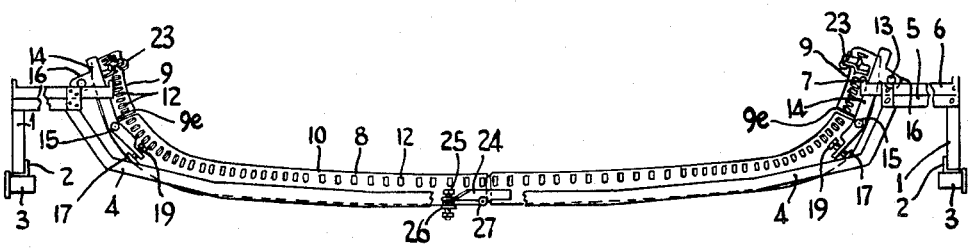
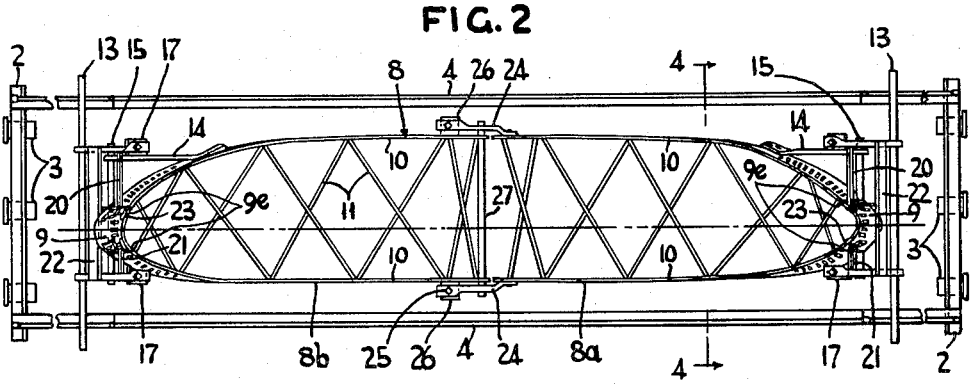
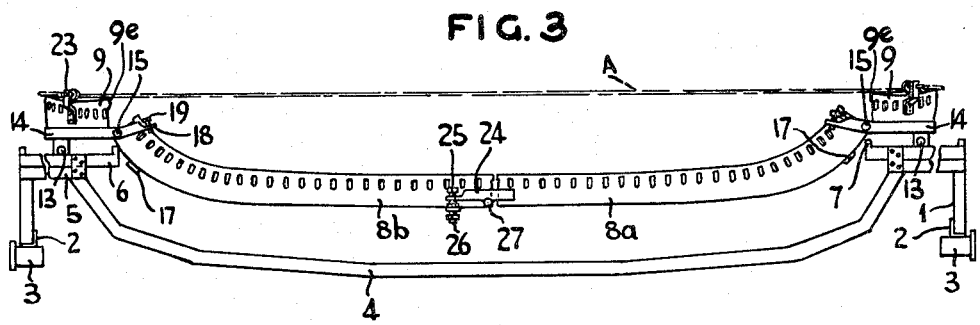
INVENTOR.
LLOYD V. BLACK

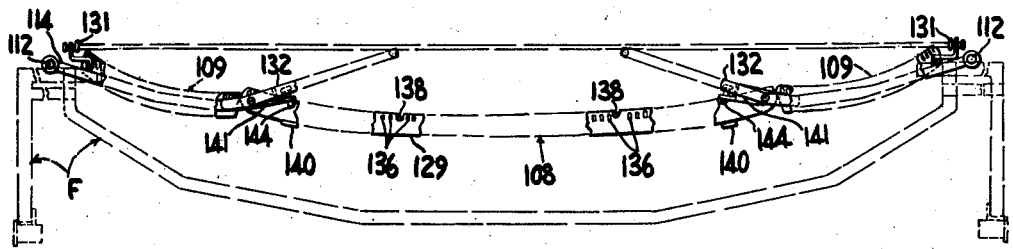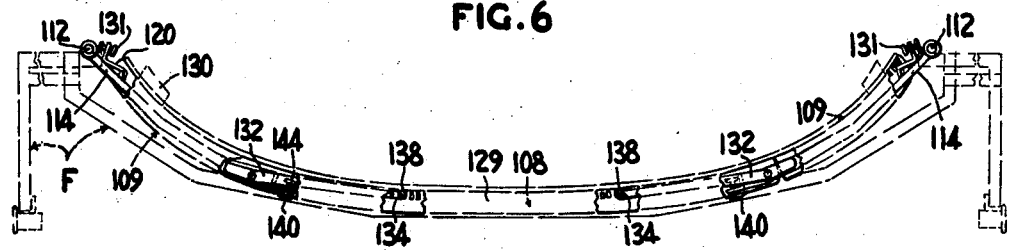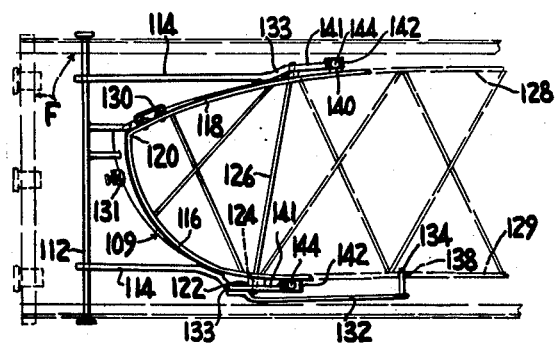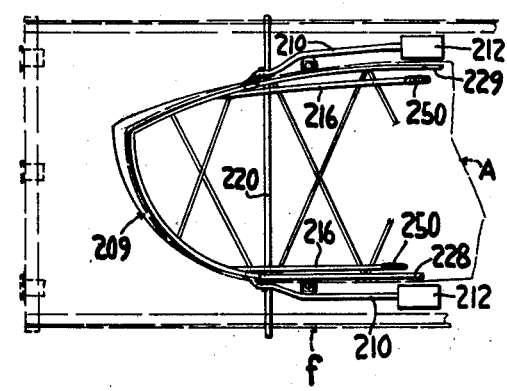

United States Patent Office 3,192,029
Patented June 29, 1965

1

3,192,029
APPARATUS FOR BENDING GLASS SHEETS WITH INTERMEDIATE FINGER SUPPORT
Lloyd V. Black, Murphy, N.C., assignor to Pittsburgh Plate Glass Company, Allegheny County, Pa., a corporation of Pennsylvania
Filed Jan. 24, 1958, Ser. No. 710,964
3 Claims. (Cl. 65—289)

The present application is a continuation-in-part of application Serial No. 368,958 of Lloyd V. Black and James S. Golightly, filed July 20, 1953, for "Glass Bending Mold," now abandoned, and of application Serial No. 438,011 of Lloyd V. Black and Harold E. McKelvey, filed June 21, 1954, for "Method and Apparatus for Bending Glass," now abandoned.

The present invention pertains in general to glass bending and specifically to sectional molds for bending flat glass sheets into various forms such as are used in present day laminated automobile windshields and tempered backlights. Such molds include a plurality of sections which are pivotally connected for movement into open and closed positions. When opened, the mold sections are spread to receive a cold flat glass sheet. The open mold and flat glass sheet are then passed through a heated bending lehr where the mold and glass are both heated. The heated glass softens, permitting the mold sections to move to closed positions. In closing, the mold shapes the glass to the contour of the mold sections.

By apparatus described in the present application, the ends of the bent sheet are curved into rather sharp radii and have considerably longer bent end portions than earlier constructions. Since extreme lengths of flat glass sheets are required to produce these bent shapes, it has become necessary to provide bending molds having the sections thereof of suitable length and sequence of operation to shape the glass substantially before permitting it to engage the mold sections in order to avoid movement of the glass relative to the mold sections after engagement with the mold shaping surfaces.

According to the prior art, bending of glass sheets is accomplished by supporting flat glass sheets on the outboard longitudinal extremities of spaced end sections of a sectionalized, skeleton mold of concave configuration provided with stop members that engage the glass edges. Heat is applied to the glass to soften the latter. The mold sections are so constructed and arranged that they tend to move from the open mold position to the closed mold position unless inhibited by the rigidity of the glass sheet. As the glass sheet softens, it conforms to the shape and outline of the continuous skeleton structure provided by the closed mold by a combination of heat sagging and force applied to the glass extremities via the stop members. The entire glass sheet is slid into alignment with the closing mold.

Unless both ends of the flat glass sheets sag and slide equally during the bending operation the sheet may get out of alignment with the mold. In cases where it is desired to bend small glass sheets into cylindrical curves, any misalignment due to unequal sagging or unequal sliding, or both, does not affect the curvature of the finished product materially. However, when bending to complex curvatures is desired, any misalignment of the glass due to non-uniform sliding of the glass on the mold, as the mold moves from open to closed position results in the formation of undesired curvatures in the glass due to the difference in size of the extremities of the misaligned glass. This error in curvature is magnified with larger sheets and more complex curvatures.

When a sheet of flat glass is laid upon a female type skeleton mold in the open position, namely, one that is concave in elevation, the flat glass forms a span between

2 the outer extremities of the wing portions of the mold. The increased size of windshields has provided such a long span between the mold extremities that the weight of the glass itself is sufficient in some cases to fracture the flat glass sheet spanning the mold. Also, in bending flat glass sheets having relatively sharp V-shape extremities, the apices of which are offset from the longitudinal axis passing through the center of gravity of the sheet, the flat glass sheet must be prevented from tilting about its initial support axis defined by its extremities so that when the glass sheet softens, it registers properly with the peripheral frame defined by the closed mold.

The present invention provides additional intermediate support points to engage and support the undersurface of the flat glass as the latter is laid upon the open mold. These support means may comprise fixed inboard extensions of the wing sections which retract from engagement with the glass as the mold rotates from the open to the closed position upon heating and softening the glass sheet. In cases where the shape of the bend permits, the mold may be cut and hinged in such a manner that the outboard extremities of the center portion of the mold act as intermediate support points for the flat glass, such as disclosed and claimed in copending application Serial No. 438,011 of Lloyd V. Black and Harold E. McKelvey, filed June 21, 1954. It is also possible that certain simpler glass bends can be obtained on a mold of the type described wherein the inboard extremities of the wing sections are utilized to support the flat glass before bending. Different embodiments of such structure are described and claimed in copending application Serial No. 368,958 of Lloyd V. Black and James S. Golightly, filed July 20, 1953, and copending application Serial No. 437,920 of William C. McRoberts, filed June 21, 1954, now abandoned.

The provision of intermediate supports eliminates the tendency of the glass to pivot about a longitudinal axis substantially parallel with the span formed by the glass across the mold due to the fact that the center of gravity of the glass is outside the axis defined by the support points provided by the mold extremities. At least one intermediate support point is required to be on the opposite side of the center of gravity from the axis of support provided by the longitudinal mold extremities in order to preclude such transverse pivoting, which results in transverse misalignment and rejectable bends.

The present invention will be better understood after studying a description of various embodiments of the present invention which follows.

In the drawings forming part of this disclosure,

FIGURE 1 shows a side elevation of one form of the present invention with the mold in closed position and illustrating the method of suspending same from the support frame;

FIGURE 2 shows a plan view of the mold and frame of FIGURE 1;

FIGURE 3 is a view similar to that of FIGURE 1 with the mold in open position to receive a flat sheet of glass in position for passage through the heating and bending lehr;

FIGURE 4 shows a cross section of the mold and frame of FIGURE 1 taken on lines 4—4 of FIGURE 2;

FIGURE 5 is an elevational view of an alternate embodiment of the present invention in the open position for receiving flat glass sheets;

FIGURE 6 is a view similar to FIGURE 5 showing the mold in its closed position supporting the glass sheet after bending;

FIGURE 7 is a fragmentary plan view of the mold shown in FIGURE 6;

FIGURES 8 and 9 are elevational views of still another embodiment of the present invention showing a bending mold provided with retractable intermediate flat glass support means in the open and closed position respectively;

FIGURE 10 is a view similar to FIGURE 8 showing part of an end portion of a mold provided with an alternate embodiment of an intermediate support means for supporting glass in accordance with the teachings of the present invention; and FIGURE 11 is a fragmentary plan view of an end portion of the mold shown in FIGURE 10.

Referring now in detail to the drawings and particularly FIGURES 1 to 4 inclusive, the frame for support of the mold approximates the shape of the mold in closed position. This frame comprises vertically disposed spaced end members 1 at each end of the frame which are connected by tie members 2 arranged for contact with lehr conveyor stub rolls 3 for moving the frame and mold through the bending lehr. These end members 1, at each side of each end of the frame, are connected by the side members 4 which approximate the shape of the mold in closed position. Each side member 4 has a flat portion 5 at each end thereof for engagement by the mold support members. I prefer however to provide an extension 6, on each portion 5, which is disposed inwardly from the end of the frame to provide for support of the mold. At the inner end of the frame extension 6 is provided a stop 7 preventing displacement of the mold from the frame.

As shown by the drawings, the frame members deepen varying distances below the level of the lehr rollers 3 and are spaced wider than the mold so as to permit ready access of a glass tempering machine within the frame. Likewise, the frame extensions 6 which carry the mold in spaced relation to the frame end members 1 and 2 provide ready access of the tempering machine to the end sections of the mold and the glass thereon.

The mold of FIGURE 1 is a three section mold comprised of a center or intermediate section 8 and end sections 9. Each of these sections have an upper surface of the shape to which the glass is to be bent. The center or intermediate section 8 is formed of two spaced thin metal side rails 10. The metal is preferably stainless steel which resists warping at the temperatures at which the glass is bent. Each side rail 10 has a plurality of openings 12 adjacent the top edge or glass supporting surface to permit ready escape of the air blown against the underside of the glass when the mold is used to support the glass during the tempering operation. The side rails 10 are held in spaced relation by cross bracing members 11. As best shown in FIGURES 1 and 2 of the drawings, the side rails 10 are curved both longitudinally and transversely of the mold to follow the contour of the bent glass shape to be formed thereon. The end mold sections 9 are likewise formed of thin metal side rails curved to conform to the contour of the bent glass. These side rails 9 also have openings 12 near the top or glass supporting surface to permit ready escape of air when the mold and glass thereon are within the tempering machine. In cases where the mold is not used to support the glass in the tempering operation, as where the glass being bent is to be laminated and not tempered, such openings 12 are not necessary in either sections 8 or 9.

The center or intermediate section 8 of the mold is suspended from the frame members 6 by means of the support rods 13, support arms 14 and center section pivot members 15. The support rods 13 may be directly connected with the support bars 14 or through lugs 16 rigidly connected to the bars 14. As shown in FIGURE 1, the support arms 14 extend beyond the pivot members 15 for selective engagement with stops 17 mounted on the center or intermediate section 8 to limit pivotal movement of the arms 14 in one direction relative to the center or intermediate sections. The engagement of bar 14 with stop 17 may be made adjustable by mounting on bar 14, by means of a suitable member 18, a cap screw 19 which engages the stop 17.

The end mold sections 9 are rigidly connected to the support arms 14. Since the end sections are narrower than center or intermediate section 8, it is sometimes necessary to connect end sections 9 with the support arms 14 by transverse members such as 20 and 21. If desired, the end mold section 9 may also be connected with the adjacent bars 14 by means of an additional transverse member 22.

The pivot members 15 mounted on the center section may be of any desired form. The most convenient form is to pass a continuous rod 15 through both sides of the center section and extend the ends of the rods a sufficient distance to engage the support arms 14. These are details of construction which are determined by the specific shape of the mold sections and the convenience of the mold manufacturer.

The usual glass supporting members 23 are mounted on the end mold sections 9. The number and location of such members 23 is dictated by the shape of the flat glass sheet to be bent. As seen in FIGURE 4, glass supporting members 23 are located outside the side rails of the end mold sections 9.

Care must be taken so that the glass sheet does not tilt during the bending thereof otherwise it may not fit the mold properly and result in rejection. Since the end portions of the glass are disposed wholly to one side of the center of gravity of the flat sheet, the glass support members cannot retain the glass sheet in equilibrium on the closing mold. For this reason I prefer to so locate the support rod 13 so that the free ends 9e of mold sections 9 engage the glass and support it on opposite sides of its longitudinal axis passing through its center of gravity in its initial flat position as shown in FIGURE 3 and also during initial closing movements of the mold.

In operation, the mold normally depends from its support rods 13 upon the arms 14. To load the mold with a glass sheet, the center or intermediate section 8 is raised vertically causing the support arms 14 to pivot about the center or intermediate section on pivots 15 and the support rods 13 slide outwardly along the frame members 6 as the mold opens. A flat glass sheet of the proper size to produce the desired bent shape is mounted on the mold between the glass supporting members 23.

The center or intermediate section 8 is then lowered slightly so that the support members 23 engage opposite ends of the glass. The weight of the center or intermediate section 8 acting through support arms 14 and end sections 9 places the glass sheet in compression. The mold and glass are then passed slowly through a bending lehr where the glass, as it softens, bends under the compressive forces so applied. In the flat glass supporting position, the free ends 9e of the end sections 9 are in the horizontal plane defined by the outboard extremities of the end sections, as shown in FIGURE 3, to provide flat glass sheet supporting means intermediate the longitudinal extremities of the supported flat glass sheets.

The mold sections 8 and 9 are of slightly less width than the glass sheet so that the glass as it sags to the mold is supported inwardly of and adjacent the edges thereof. As fully described in my copending application, Serial No. 238,943, now Patent No. 2,736,140, the bending lehr is preferably heated by electrical heating coils disposed above the glass on the molds. By suitable arrangement and operation of the heating coils, the glass may be selectively heated to higher temperatures at certain areas thereof.

The center section of extremely long glass sheets bent on such molds tends to sag before the end sections. By the selective heating referred to, the glass may be so heated that the glass is bent in such a manner that no substantial movement of the glass, relative to the mold, occurs after the glass contacts the mold. The mold therefore moves to closed position with the softening of the glass, and the glass conforms to the contour of the closed mold. The free ends 9e of the end sections 9 move to positions below the flat horizontal plane defined by the outboard extremities of the end sections as the mold moves to its closed position.

Several adjustments are provided in the molds of FIGURES 1 to 4 inclusive. As shown in FIGURE 1 of the drawings, the support arms 14 do not directly contact stop 17 on the center or intermediate section. This contact is made through the adjusting screw 19. By suitable manipulation of screw 19 the relative positions between end sections 9 and center or intermediate section 8 of the mold may be regulated. A further adjustment is provided by the arm 24, screw 25 and stop 26 on the center or intermediate section 8. By splitting center or intermediate section 8 into two parts, welding one end of arm 24 to section 8a and pivoting arm 24 on section 8b as by pivot rod 27, the end mold sections may be spread a greater distance than would be possible if the center or intermediate section were in one piece. This slight pivotal movement between sections 8 and 8a will facilitate loading of the glass upon the mold. A mold such as in FIGURE 3 has its end sections 9 substantially flat in the open position so as to help support glass. If the glass sheet is slightly long, the mold may not open sufficiently to receive the glass. When the center or intermediate section has an adjustable pivotal conection, a slight pivotal movement between the sections 8a and 8b opens the mold wide enough to receive the glass. The sections 8a and 8b then return substantially to normal position before the glass is heated, or shortly thereafter so that this hinging movement does not enter into the shaping of the glass.

The embodiment disclosed in FIGURES 5 through 7 is specially constructed to bend glass sheets having relatively sharp V-shaped extremities, the apices of which are offset from the longitudinal axis passing through the center of gravity of the sheet. In this embodiment, arms are associated with the opposite end sections of a hinged type bending mold so as to be movable during movement of the mold from the open to the closed position. These arms are located at the side of the mold to which an unbalanced sheet will tend to slip and, in the open position of the mold, is elevated above the mold to a point approximately level with the locating means which engage the ends of the flat glass sheets. During movement of the mold, and particularly its end sections, the arms are caused to move downwardly below the shaping surface of the mold to permit the sheet to conform to the shaping surface.

Inturned fingers are located at the end of the arms to engage the undersurface of the glass sheet and to nest within a notched portion of the mold shaping surface. The arms prevent the glass sheet from tilting to one side and slipping from its properly supported position relative to the mold in a manner similar to that provided by the inboard extremities 9e of the mold described in the first embodiment. The arms are so constructed that their fingers which contact the undersurface of the flat glass inboard of its extremities along the heavy side edge substantially leads the softening glass sheet so as to permit it to freely conform to the curvature of the mold shaping surface.

At the outer ends of the end sections of the mold, where the rails forming the endmost section meet in the form of a V, spaced glass edge contacting members are provided on opposite sides of the apex formed by the rail sections.

The mold of the embodiment of FIGURES 5 through 7 comprises a center section 108 and spaced end rail sections 109 pivotally mounted with respect to the center section 108. The mold is supported from a frame F (shown fragmentally, but similar to the support frame 1, 2, 3, 4, 5, 6 of the first embodiment) by means of rods 112. Links 114 interconnect the supporting rods 112 with the end mold sections 109. The wing sections 109 comprise curved rails 116 and 118 which converge toward the extremities of the mold to form a V-shaped extremity 120 offset with respect to the longitudinal axis passing through the center of gravity of the glass sheet.

At the inboard extremities of the rails 116 and 118 bearing bracket members 122 are connected. These bearing bracket members are apertured to provide bearings 124 to support a bearing support rod 126. The bearing support rods interconnect and extend through the longitudinal extremities of spaced rails 128 and 129 which comprise the center section 108.

Glass edge contacting members 130 are adjustably secured to the rail members 118 and glass edge contacting members 131 are similarly secured to rail members 116 in outwardly spaced relation to said rail members for contacting the edges of a flat glass sheet to be bent near its V-shaped extremities 120. The glass edge contacting members 130 are located toward the side of the mold containing side rail 128 in its central section.

Arms 132 extend inwardly and upwardly from their attachments to inward extensions 133 of the links 114 secured to rail members 116. These arms terminate in laterally inwardly directed fingers 134 for contacting the undersurface of the flat sheet to be bent toward the side of the mold containing side rail 129. Arms 132 and fingers 134 rotate in unison with end rail sections 109 about the bearings 124.

Rails 128 and 129 are apertured at 136 to provide space for the escape of air from the surface of the glass sheet after tempering. Two of these apertures in center section rail 129 extend completely through the glass shaping surface to form notches 138 permitting the arms 132 and fingers 134 to move below the shaping surface of the mold.

Ledges 140, similar to the stops 17 of the first embodiment, are attached to the outboard side of rails 128 and 129 near their longitudinal extremities. A stop supporting arm 141 terminating at its inboard extremity in an apertured L-shaped member 142 is attached to the inboard end of each link extension 133. Set screws 144 are adjustably mounted through the aperture of each L-shaped member 142. Thus, the end mold sections 109, bearing brackets 122, L-shaped members 142 and set screws 144 rotate as integral members about spaced axes of rotation provided by the bearings 124 until set screws 144 contact ledges 140, thus precluding further relative movement between adjacent mold sections. The set screws 144 are adjusted in the L-shaped members to enable the mold sections to provide a substantially continuous frame conforming in elevation and outline to the shape desired for the bent glass sheet, but encompassing an area slightly smaller than that defined by the outline of the bent sheet.

On swinging the mold to the open position, arms 132 move as the end sections 109 rotate about the pivot rods 126 from the closed mold position of FIGURES 6 and 7 to the open mold position of FIGURE 5. Arms 132 are disposed in proper orientation to the rails 116 of the end mold section 109 in order to have the fingers 134 disposed in proper position to support the flat glass sheet at a level defined by the mold extremities 120 and to drop below the shaping surface of the mold into the notches 138 at a predetermined phase of the bending cycle.

The fingers 134 "lead" the sagging sheet if the arms 132 are secured to the curved rail 116 in proper relation. Unless this precaution is taken, the sagging sheet will kink in the locations supported by the fingers 134. Furthermore, the arms 132 and fingers 134 are disposed in such a manner relative to the mold that they support only the marginal portions of the glass sheet. Therefore, any marks that form on the sheet by virtue of the contact of fingers 134 will be located along a very narrow strip along the marginal portions.

Operation of this mold is as follows. The center section 108 is raised thereby permitting the end sections 109 to rotate relative to the bearing support rods 126 into an outwardly spread position. A flat glass sheet precut to outline is mounted to be supported at the longitudinal extremities 120 of the spaced end mold sections 109. The weight of the center section 108 causes the mold to move toward its closed mold position until the glass edge supporting members 130 and 131 contact the edges of the glass sheet. The glass edge contacting members 130 are adjustable to enable the edges of the flat glass sheet to be outboard from the ends of the mold. In fact, the entire margin of the glass sheet is located beyond the mold by virtue of the fact that the outline of the mold in its closed position encompasses an area smaller than that of the glass sheet. The glass edge contacting members 130 and 131, the supporting arms 132 and fingers 134 are so constructed relative to the entire mold structure that the undersurface of the glass sheet is supported along one side by the fingers 134 at the same time as the mold extremities 120 formed by the converging portions of the curved rails 116 and 118 of the wing sections 109 support the glass sheet in the same plane as that provided by the fingers 134 and simultaneously the edges are contacted by the glass edge contacting members 130 and 131. Thus the glass is compressed as a strut between the glass edge contacting members 130 and 131 while supported in a single plane at its undersurface by the longitudinal mold extremities 120 and the fingers 134 of the arms 132.

When the flat glass sheet supported in the manner described is heated to bending temperature, the sheet softens and loses its strut-like character. The fingers 134 swing downwardly as the center section 108 pulls the wing sections 109 toward the closed mold position. As the sheets begins to sag, it also tends to tilt toward the side along center section rail 129 because of the unbalance of weight relative to the support points at the longitudinal extremities 120 of the end sections 109 of the mold. However, the fingers 134 provide means for preventing overpivoting of the sheet relative to the mold as it sags to conform to the mold shaping surface.

The mold sections 108 and 109 in the closed mold position provide a substantially continuous frame at the upper surfaces conforming in elevation and outline to the ultimate shape desired for the bent glass sheet. Thus, since the fingers 134 are permitted to lead the glass sheet, the fingers will engage the notches 138 and permit the entire glass sheet to engage the shaping surface defined by the mold sections.

FIGURES 8 through 11 depict still other embodiments of the present invention.

In these embodiments, the sectionalized molds have pointed extremities and comprise a center section 208 comprising center section rails 228 and 229, and end sections 209 that are sharply curved to provide the pointed mold extremities. A counterweighted arm 210 terminating at its inboard extremity in a counterweight 212 is attached to each inboard extremity of each end section 209. Pivot bearings 214 are attached rigidly to the center section 208 to permit the end sections 209 and their attached counterweight arms 210 and counterweights 212 to rotate thereabout. In addition, outriggers 216 extend upwardly and inwardly from the inboard ends of the end sections 209 to terminate in free running ceramic wheels 218. The latter provide the intermediate flat glass sheet support means along both sides of the flat glass sheet such as provided by the inboard extremities 9e of the end mold sections 9, and along one side only of the flat sheet by the fingers 134 attached to the end sections 109 of the preceding embodiments.

Outriggers 216 are so constructed and arranged relative to the end sections 209 that in the open mold position the free running ceramic wheel 218 contacts and supports the flat glass sheet A adjacent the glass periphery at points spaced intermediate the ends of the open mold. The lateral location of the intermediate support points provided by the free running ceramic wheels 218 precludes tilting of the glass about its longitudinal axis due to the location of the center of gravity of irregularly shaped glass sheets to one side of their longitudinal axes.

The center section 208 is rigidly supported on a frame f shown in phantom by means of support rods 220 rigidly carried by the superstructure 222 of the support frame f.

In this embodiment of bending mold, the mass of the flat glass sheets A while rigid rests on the outboard extremities of the end sections 209 and the ceramic wheels 218. The counterweight arms 210 and the counterweights 212 are so constructed and arranged as to provide a bending moment tending to rotate the end sections 209 into the closed mold position that is too small to rotate the end sections when the flat glass is cold and rigid. However, when the glass and the mold are exposed to glass softening temperatures, the rotational moments provided by the counterweights 212 cause the end sections 209 to rotate, thereby lifting the extremities of the glass sheets and imparting the upper shaping surface of the mold sections 208 and 209 onto the heat-softened glass sheet extremities.

Stop members (not shown) are also provided in this embodiment to limit the closing of the mold. Thus, in the closed mold position, mold sections 208 and 209 provide a substantially continuous frame conforming in elevation and outline to the shape desired for the bent glass sheet and encompass an area slightly smaller than that of the glass sheet. Thus, the margin of the glass sheet extends beyond the perimeter of the mold, thus enabling the margin of the glass to develop a desired compressive stress as it cools more rapidly than the region inboard of the peripheral margin whose cooling after bending is retarded by virtue of its contact with the mold supporting surface.

As the glass sheet A softens, thereby permitting the end sections 209 to be rotated upwardly by the action of the counterweights 212, the central portion of the glass sheet sags until it conforms to the shape provided by the upper surface of the rails 228 and 229 forming the center section 208. In this embodiment also, as the mold rotates to its closed position, the intermediate support means provided by the ceramic wheel 218 "leads" the glass sheet and is located below the mold shaping surface as shown in FIGURE 9.

It is not necessary that the intermediate glass supporting member be provided by a roller. The ends of the outriggers may be provided with a covering 250 of a refractory material such as asbestos to protect the undersurface of the glass, as shown in FIGURE 10. The plan view in FIGURE 11 shows how the outriggers 216 with the ceramic tips 250 nest within the rails 228 and 229 of the center section 208 when the end sections 209 are rotated to the closed mold position.

The molds disclosed in the embodiments depicted in FIGURES 8 through 11 are primarily designed for producing windshields wherein glass sheets are bent in pairs and annealed prior to lamination. However, it is possible to interchange the various types of intermediate support members disclosed in the various embodiments of the present invention. For example, notches may be provided in the rails 228 and 229 of the center section 208 to enable intermediate support means such as the arms 132 and fingers 134 to be employed in the FIGURES 8 to 11 embodiments. Similarly, if tempering is not desired, the embodiment of FIGURES 5 to 7 may incorporate outriggers such as exemplified in FIGURES 8 through 11. Furthermore, any of the various intermediate supports may be employed with molds having either a center section that is movable relative to the mold supporting frame (FIGURES 1–7) or a center section supported in fixed position relative to the mold supporting frame.

The various embodiments have been described above for purposes of illustrating rather than limiting the present invention. Reference to the latter may be obtained by studying the accompanying claims.

What is claimed is:

1. Apparatus for bending glass sheets to curved shapes comprising a support frame, a plurality of mold sections having upper shaping surfaces, said mold sections including a central mold section rigidly supported on said support frame and end mold sections movable into a spread mold position to support an unbent glass sheet and into a closed mold position where their upper shaping surfaces form a substantially continuous outline corresponding to the shape desired for the bent sheet, and flat sheet supporting means movable in synchronism with the movement of said end mold sections to a position in a plane defined by the mold extremities intermediate and spaced from the latter a minimum distance equal to the length of one of said end mold sections when the mold sections move into the spread mold position and to a position below a plane defined by the mold extremities intermediate the latter when the mold sections move into the closed mold position.

2. An outline mold for bending glass sheets to curved shapes comprising a plurality of mold sections having upper shaping surfaces of concave elevation, said mold sections including a central mold section comprising a pair of laterally spaced, elongated shaping rails whose upper edge surfaces form the longitudinal side edges of an outline shaping surface of said mold and additional mold sections pivotally attached to the ends of said central mold section for movement into a spread position and into a closed position, said additional mold sections having upper edge surfaces forming continuations of said upper edge surfaces of said center section rails in the closed position, notches in one of said center section rails, an arm attached at its outer end portion to one of said additional mold sections located beyond one end of said central mold section, said arm extending longitudinally inward of said mold laterally outside said notched rail, a laterally inwardly extending finger attached at its outer end to the inner end portion of said arm and extending inward beyond said notched rail, an additional arm attached at its outer end portion to another of said additional mold sections located beyond the other end of said central mold section, said additional arm extending longitudinally inward of said mold laterally outside said notched rail, an additional laterally inwardly extending finger attached at its outer end to the inner end portion of said additional arm and extending inward beyond said notched rail, said finger and additional finger being constructed and arranged to pivot in synchronism with said additional mold sections into a flat glass supporting position in the spread mold position and to a position within said notches and below the outline shaping surface in the closed mold position.

3. Apparatus for bending glass sheets to curved shapes comprising a plurality of mold sections having upper shaping surfaces, said mold sections including a pair of longitudinally spaced mold sections and a central mold section, said spaced mold sections being pivotable into a spread mold position to support an unbent glass sheet and into a closed mold position wherein their upper surfaces form substantially continuations of the upper surfaces of said central mold section, and flat sheet supporting means comprising a free running wheel and outrigger means attached to each wing section and extending toward said other spaced section and supporting said free running wheel at its inner end portion intermediate the ends of said central mold section, whereby said flat sheet supporting means move in synchronism with movement of said spaced mold sections to a position wherein the free running wheel makes peripheral contact with the undersurface of said unbent glass sheet in a plane defined by the mold extremities intermediate and spaced from the latter when the spaced mold sections pivot into the spread mold position and to a position wherein the free running wheel is below the shaping surface when the spaced mold sections pivot into the closed mold position, said apparatus further including a mold support frame and means rigidly supporting said central mold section on said mold frame.

References Cited by the Examiner
UNITED STATES PATENTS
2,814,164   11/57   Carson et al. _____ 65—290

DONALL H. SYLVESTER, *Primary Examiner.*

WILLIAM J. STEPHENSON, MORRIS O. WOLK,
*Examiners.*